(12) United States Patent
Cho et al.

(10) Patent No.: US 9,722,238 B2
(45) Date of Patent: Aug. 1, 2017

(54) BATTERY PACK

(71) Applicant: Samsung SDI Co., Ltd., Yongin-si, Gyeonggi-do (KR)

(72) Inventors: Su-Sang Cho, Yongin-si (KR); Eun-Gyeong Gu, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 190 days.

(21) Appl. No.: 14/805,832

(22) Filed: Jul. 22, 2015

(65) Prior Publication Data

US 2016/0126536 A1    May 5, 2016

(30) Foreign Application Priority Data

Oct. 30, 2014  (KR) .................... 10-2014-0149314

(51) Int. Cl.
    *H01M 2/36*          (2006.01)
(52) U.S. Cl.
    CPC ..................... *H01M 2/36* (2013.01)
(58) Field of Classification Search
    CPC ...................................... H01M 2/36
    USPC ......................................... 429/82
    See application file for complete search history.

(56) References Cited

U.S. PATENT DOCUMENTS

| 2012/0251848 A1 | 10/2012 | Cho |
| 2013/0130073 A1 | 5/2013 | Kim et al. |
| 2014/0332085 A1* | 11/2014 | Grace ............... H01M 10/4228 137/2 |

FOREIGN PATENT DOCUMENTS

| KR | 2012-0111163 | 10/2012 |
| KR | 2013-0056530 | 5/2013 |
| KR | 2013-0143440 | 12/2013 |

* cited by examiner

*Primary Examiner* — Basia Ridley
*Assistant Examiner* — James Erwin
(74) *Attorney, Agent, or Firm* — Knobbe Martens Olson & Bear LLP

(57) ABSTRACT

Provided is battery pack, including a plurality of battery cells that and a case covering the plurality of battery cells, wherein at least one drainage hole is formed on a bottom of the lower case, that includes a first region and a second region, the first region being a region from an inner surface to a predetermined depth in a thickness direction of the bottom of the lower case and the second region being a region from where the first region ends to an outer surface from the thickness direction of the bottom of the lower case, wherein the first region includes a first tiling portion formed tilted such that the drainage hole becomes smaller, grooves formed at regular intervals along a circumference of the drainage hole from where the first tilting portion ends to the outer surface of the bottom of the lower case and a foreign substance blocking portion formed on a same plane as the outer surface of the lower case.

20 Claims, 5 Drawing Sheets

BATTERY PACK

RELATED APPLICATIONS

This application claims priority to and the benefit of Korean Patent Application No. 10-2014-0149314, filed on Oct. 30, 2014, in the Korean Intellectual Property Office, the entire content of which is incorporated herein by reference in its entirety.

BACKGROUND

Field

Embodiments relate to a battery pack, and more particularly, to a battery pack with enhanced safety.

Description of the Related Technology

Generally, a battery cell is used as an energy source for a mobile device, an electric vehicle, a hybrid vehicle, electricity and the like. Depending on the type of the external device to which it is applied, the form may change.

For electric vehicles, hybrid vehicles, power tools and the like that consume much power and that operate a long time and require high power a high capacity battery module formed by electrically coupling a plurality of battery cells to increase output and capacity may be used. The battery module may increase an output voltage or output current depending on the number of battery cells that is internally mounted. A battery pack may be formed by electrically coupling a plurality of such battery modules.

Such battery packs used in power tools may be frequently used outdoors and when it rains. However, since there is no drainage structure for battery packs, moisture that is introduced into the battery pack may not be drained out. If moisture pools remain inside the battery pack, the protective circuit module may be short circuited, thereby damaging the battery pack.

SUMMARY OF CERTAIN INVENTIVE ASPECTS

Embodiments may be realized by providing a battery pack, including a plurality of battery cells that are electrically coupled to one another and a case covering the plurality of battery cells and including an upper case and a lower case, wherein at least one drainage hole is formed on a bottom of the lower case, wherein the drainage hole includes a first region and a second region, the first region being a region from an inner surface to a predetermined depth in a thickness direction of the bottom of the lower case and the second region being a region from where the first region ends to an outer surface from the thickness direction of the bottom of the lower case, wherein the first region includes a first tiling portion formed tilted such that the drainage hole becomes increasingly smaller, grooves formed at regular intervals along a circumference of the drainage hole from where the first tilting portion ends to the outer surface of the bottom of the lower case and a foreign substance blocking portion formed on a same plane as the outer surface of the bottom of the lower case The drainage holes provided in the second region may be formed of a consistent size.

The foreign substance blocking portion may be formed of a same size as the drainage holes provided in the second region.

The foreign substance blocking portion may have a thickness that is smaller than a depth of the grooves.

The drainage holes may be formed adjacent to corners of the bottom of the lower case.

The bottom of the lower case may include a second tiling portion that is formed tilted increasingly lower towards the drainage holes from a center region between the drainage holes provided in symmetrical positions.

An inner surface of the bottom of the lower case may be formed tilted and an outer surface of the bottom of the lower case is formed flat such that a thickness of the bottom of the lower case varies.

The drainage holes may be manufactured using a mold.

A receiving portion may be formed at one region of the upper case and a projecting portion may be formed at the lower case corresponding to the receiving portion such that the receiving portion and the projecting portion are interlocked.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF CERTAIN INVENTIVE EMBODIMENTS

Figure 1:
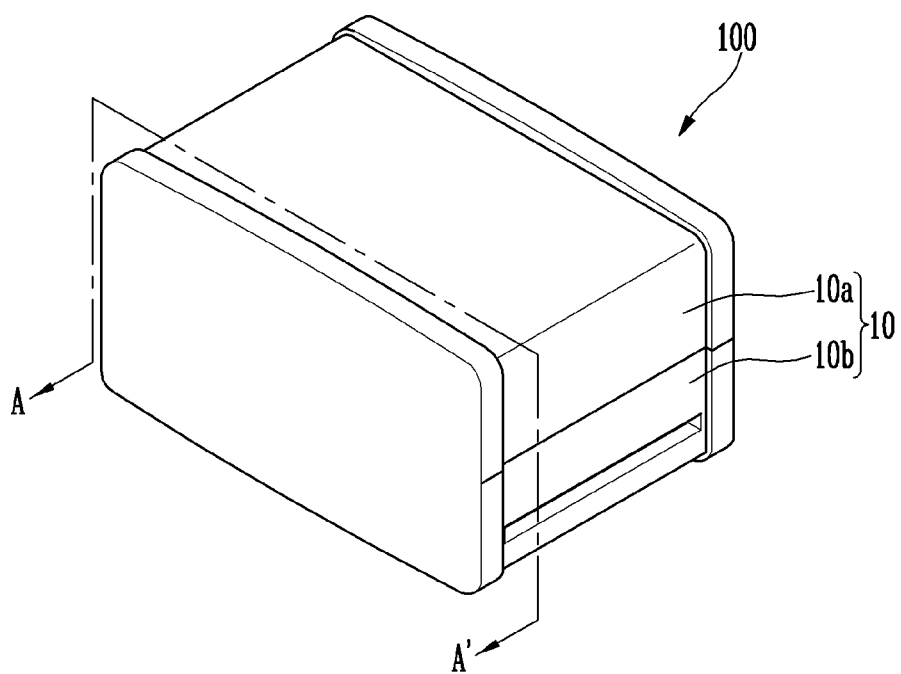
FIG. 1 is a perspective view illustrating a battery pack according to an embodiment.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" other element, it can be directly on the another element or be indirectly on the other element with one or more intervening elements interposed therebetween. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Also, when an element is referred to as being "connected to" other element, it can be directly connected to the other element or be indirectly connected to the other element with one or more intervening elements interposed therebetween. Hereinafter, like reference numerals refer to like elements. In the drawings, the thickness or size of layers are exaggerated for clarity and not necessarily drawn to scale.

Figure 2:
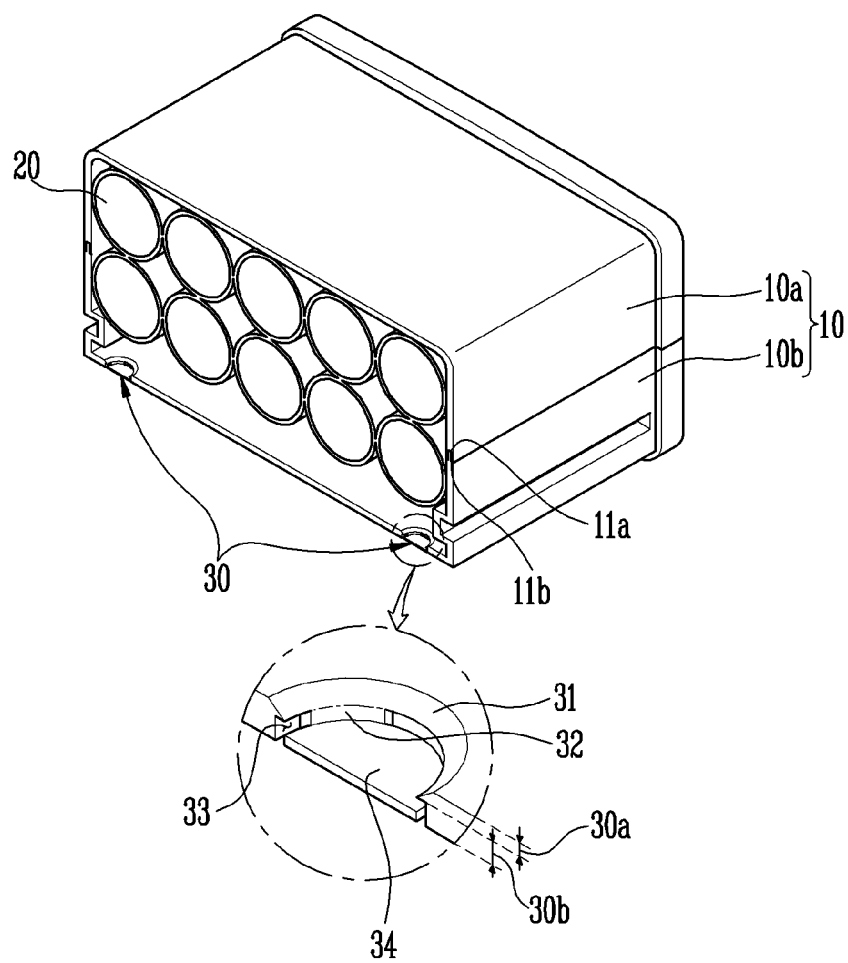
FIG. 2 is a perspective view illustrating a cross section along A-A' of FIG. 1.

FIG. 1 is a perspective view illustrating a battery pack according to an embodiment. FIG. 2 is a perspective view illustrating a cross section along A-A' of FIG. 1.

Referring to FIGS. 1 and 2, a battery pack 100 may include a plurality of battery cells 20 electrically coupled together and a case 10 surrounding the plurality of battery cells 20. The case 10 may include an upper case 10a and a lower case 10b. At least one drainage hole 30 may be formed on a bottom of lower case 10b.

The drainage hole 30 may be a region through which one region of the bottom of the lower case 10b partially passes. If moisture is introduced into inside of the battery pack 100, moisture may be smoothly discharged through the drainage hole 30. Generally, no drainage holes are formed on a prior art battery pack case, and accordingly, when it rains, rainwater may pool inside the case as rainwater permeates inside the battery pack and is not drained. A protective circuit module may short-circuit, and as a result, the battery pack may be damaged and may be unusable.

By forming at least one drainage hole 30 on the bottom of the lower case 10b, safety of the battery pack 100 may be improved by facilitating drainage of moisture when moisture is introduced inside the battery pack 100. The drainage hole 30 may be easily made using a mold, with a structure that prevents or inhibits foreign substances from penetrating into the battery pack through the drainage hole 30 without any additional component such as a rib.

The drainage hole 30 may be divided into two regions depending on a depth in which it is formed. The drainage hole 30 may include a first region 30a and a second region 30b. The first region 30a may be from an inner surface to a predetermined depth in thickness direction of the bottom of the lower case 10b. The second region 30b may be from where the first region 30a ends to an outer surface in thickness direction of the bottom of the lower case 10b.

The first region 30a may include a first tilting portion 31. The first tilting portion 31 may be formed tilted and increasingly smaller going towards its lower part. The second region 30b may include a groove 33 and a foreign substance blocking portion 34. The groove 33 may be formed at regular intervals along a circumference of the drainage hole 30 from where the first tilting portion 31 ends to the outer surface of the bottom of the lower case 10b. The foreign substance blocking portion 34 may be formed at a same plane as the outer surface of the bottom of the lower case 10b.

The drainage hole 30 provided in the second region 30b may be formed of a same size, that is, from where the first region 30a ends to the outer surface from thickness direction of the bottom of the lower case 10b. The foreign substance blocking portion 34 may be formed of a size corresponding to the drainage hole 30 provided in the second region 30b.

A thickness of the foreign substance blocking portion 34 may be formed smaller than a depth of the groove 33. As a result, the drainage hole 30 and the groove 33 may be passed through, forming a path through which moisture can move. The path that moisture moves through from inside of the battery pack 100 to the outside will be described subsequently with reference to FIG. 6.

The grooves 33 may be formed along a circumference of the second region 30b of the drainage hole 30. Those sections of the circumference of the second region 30b where the grooves 33 are not formed may be formed as connecting portions 32 from a boundary of the first region 30a and the second region 30b of the drainage hole 30 to the foreign substance blocking portion 34.

A receiving portion 11a may be formed at a region of an upper case 10a. A projecting portion 11b may be formed at the lower case 10b corresponding to the receiving portion 11a. That is, at a region where the upper case 10a and the lower case 10b meet, the receiving portion 11a and the projecting portion 11b may be formed, the receiving portion 11a being received by the upper case 10a and the projecting portion 11b formed at the lower case 11b. The upper case 10a and the lower case 10b may be firmly coupled to each other as the receiving portion 11a and the projecting portion 11b are interlocked. However, the coupling of the upper case 10a and the lower case 10b is not limited hereto. By way of example and without any limitation, the projecting portion may be formed at the upper case and the receiving portion may be formed at the lower case also such that the upper case and the lower case may be coupled to each other as the projecting portion and the receiving portion are interlocked.

Figure 3A:
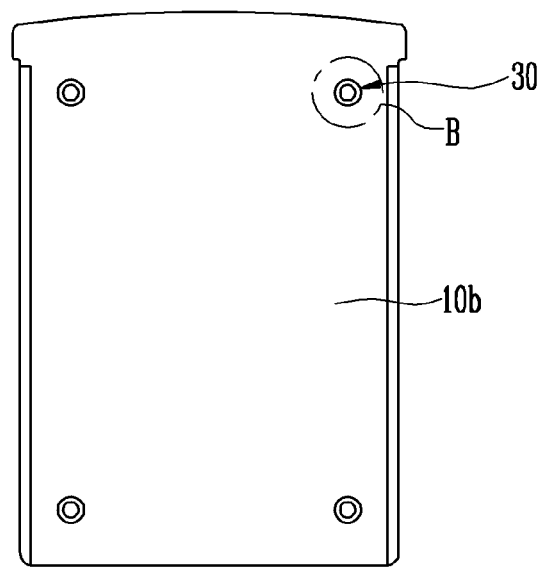
FIG. 3A illustrates a shape of inside of a lower case bottom of a battery pack according to an embodiment.
Figure 3B:
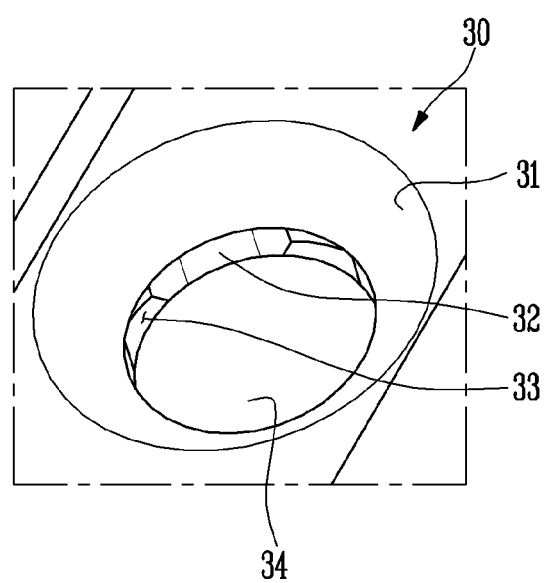
FIG. 3B is a perspective view, taken from inside, illustrating drainage holes formed on the lower case bottom that is shown in FIG. 3A.

FIG. 3A illustrates a shape of inside of a lower case bottom of a battery pack according to an embodiment. FIG. 3B is a perspective view, taken from inside, illustrating drainage holes formed on the lower case bottom that is shown in FIG. 3A.

Referring to FIGS. 3A and 3B, at least one drainage hole 30 may be formed on a bottom of a lower case 10b. The drainage holes 30 may be formed adjacent to four corners of the bottom of the lower case 10b but the present invention is not limited hereto.

The drainage hole 30 may include a first region 30a and a second region 30b (refer to FIG. 2). The first region 30a may be from an inner surface to a predetermined depth in thickness direction of the bottom of the lower case 10b. The second region 30b may be from where the first region 30a ends to an outer surface in thickness direction of the bottom of the lower case 10b.

The first region 30a may include a first tilting portion 31. The first tilting portion 31 may be formed tilted and increasingly smaller going towards its lower part. The first region 30a on an inner surface side of the bottom of the drainage holes 30 formed on the bottom of the lower case 10b may be formed tilted towards the lower part such that moisture introduced inside the battery pack 100 (refer to FIG. 1) may be easily drained via the drainage hole 30.

The second region 30b may be a region from where the first tilting portion 31 ends to the outer surface of the bottom of the lower case 10b. The second region 30b may include a groove 33 and a foreign substance blocking portion 34. The groove 33 may be formed at regular intervals along a circumference of the drainage hole 30. The foreign substance blocking portion 34 may be formed at a same plane as the outer surface of the bottom of the lower case 10b.

The drainage hole 30 provided in the second region 30b may be formed as a same size, that is, from a boundary of the first region 30a and the second region 30b to the outer surface of the bottom of the lower case 10b. The foreign substance blocking portion 34 may be formed of a same size as the drainage hole 30 of the second region 30b. Also, a thickness of the foreign substance blocking portion 34 may be formed smaller than a depth of the groove 33. As a result, the groove 33 and the second region 30b of drainage hole 30 may be passed through, thereby forming a path through which moisture inside the battery pack 100 may be easily discharged.

The drainage hole 30 may allow moisture that is inside the battery pack to be easily drained and yet prevent foreign substance from being introduced inside the battery pack from outside via the drainage hole 30.

Figure 4A:
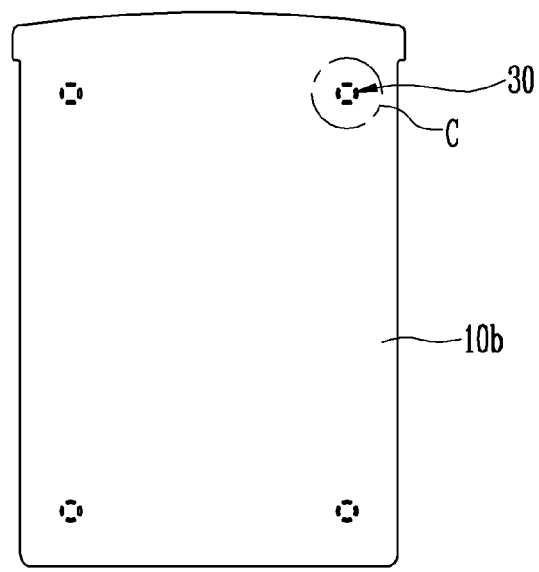
FIG. 4A illustrates an exterior appearance of a lower case bottom of a battery pack according to an embodiment.
Figure 4B:
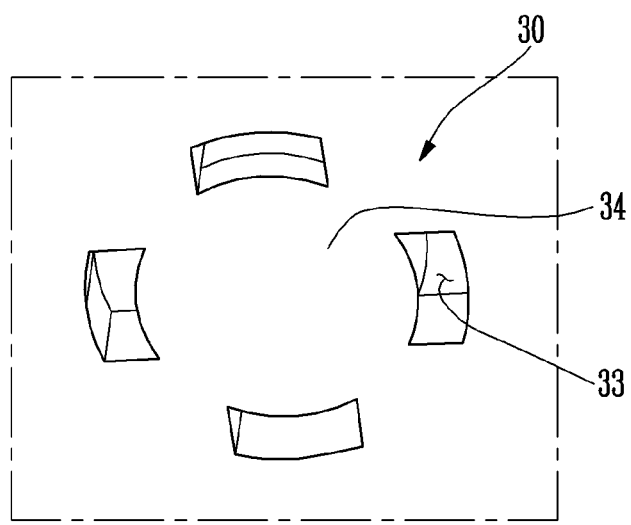
FIG. 4B is a perspective view, taken from outside, illustrating drainage holes formed on the lower case bottom shown in FIG. 4A.

FIG. 4A illustrates an exterior appearance of a lower case bottom of a battery pack according to an embodiment. FIG. 4B is a perspective view, taken from outside, illustrating drainage holes formed on the lower case bottom shown in FIG. 4A.

Referring to FIGS. 4A and 4B, grooves 33 may be formed at regular intervals along a circumference of a drainage hole 30 and a foreign substance blocking portion 34 may be formed on a same plane as an outer surface of a bottom of a lower case 10b.

A thickness of the foreign substance blocking portion 34 may be formed thinner than a depth of the grooves 33, and an opening may be formed by having the grooves 33 and a second region 30b of the drainage hole 30 be passed through. The foreign substance blocking portion 34 may be formed of a same size as the second region 30b of the drainage hole 30.

Figure 5:
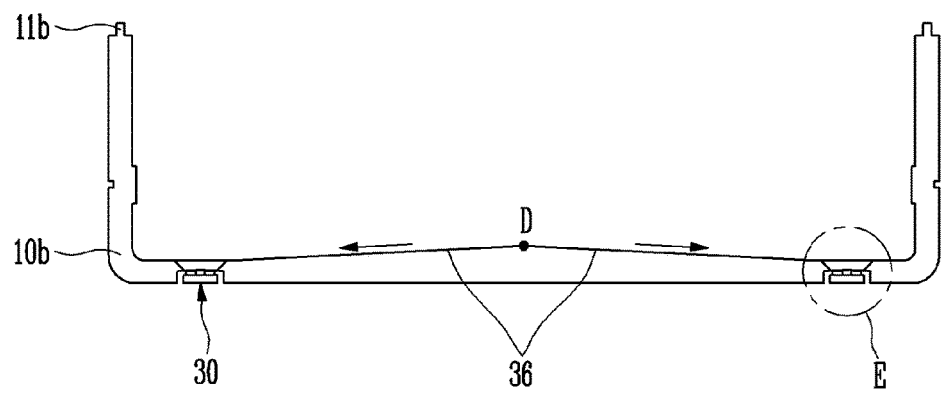
FIG. 5 is a cross-sectional diagram illustrating a bottom of a battery pack according to another embodiment.

FIG. 5 is a cross-sectional diagram illustrating a bottom of a battery pack according to another embodiment.

Referring to FIG. 5, drainage holes 30 may be formed adjacent to four corners of a bottom of a lower case 10b. The bottom of the lower case 10b may include second tilting portions 36 formed tilted towards the drainage holes 30. The second tilting portions 36 may be formed tilted lower towards the drainage holes 30 from a center region D between the drainage holes 30 formed at symmetrical locations at the bottom of the lower case 10b.

A thickness of the bottom of the lower case 10b may not be uniform throughout as an inner surface of the bottom of the lower case 10b may be tilted and an outer surface of the bottom of the lower case 10b may be flat. The bottom of the lower case 10b may have an increasingly thinner thickness as it is nearer the drainage holes.

As a result, moisture that is introduced inside the battery pack 100 may be caused to move more easily towards the drainage holes 30 without pooling inside.

Figure 6:
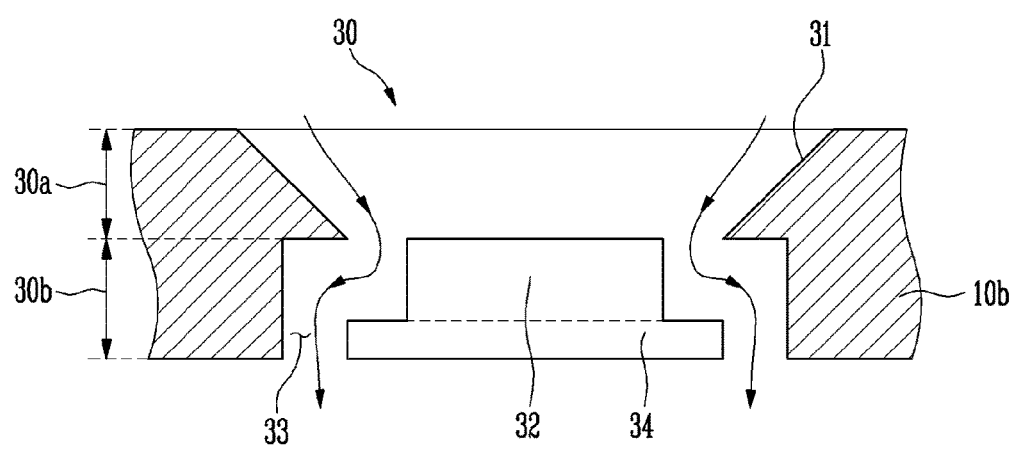
FIG. 6 illustrates a path through which moisture that is introduced inside of a battery pack is drained.

FIG. 6 illustrates a path through which moisture that is introduced inside of a battery pack is drained.

Referring to FIG. 6, a drainage hole 30 may include a first region 30a and a second region 30b. The first region 30a may be provided on an inner surface side of a bottom of a lower case 10b. The second region 30b may be provided on an outer surface side of the bottom of the lower case 10b. The first region 30a may include a first tilting portion 31 where the drainage hole 30 is formed increasingly smaller towards its lower part such that moisture may be drained easily. The second region 30b may include grooves 33 that are formed spaced apart at regular intervals along a circumference of the drainage hole 30 and a foreign substance blocking portion 34.

The foreign substance blocking portion 34 may be formed of a same size as the drainage hole 30 formed at a boundary of the first region 30a and the second region 30b. A thickness of the foreign substance blocking portion 34 may be thinner than a depth of the grooves 33.

The moisture introduced inside the battery pack 100 may move to the second region 30b of the drainage hole 30 via the first tiling portion 31 formed in the first region 30a of the drainage hole 30. The moisture that moved to the second region 30b of the drainage hole 30 may move and be drained to the grooves 33 located at the bottom of the lower case 10b by moving via a region made open by the second region 30b of the drainage hole 30 and the grooves 33.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
   a plurality of battery cells that are electrically coupled to one another; and
   a case covering the plurality of battery cells and including an upper case and a lower case,
   wherein at least one drainage hole is formed on a bottom of the lower case,
   wherein the drainage hole includes a first region and a second region, the first region being a region from an inner surface to a predetermined depth in a thickness direction of the bottom of the lower case and the second region being a region from where the first region ends to an outer surface from the thickness direction of the bottom of the lower case,
   wherein the first region includes a first tilting portion formed tilted such that the drainage hole becomes increasingly smaller, and wherein grooves are formed at regular intervals along a circumference of the drainage hole from where the first tilting portion ends to the outer surface of the bottom of the lower case and a foreign substance blocking portion formed on a same plane as the outer surface of the bottom of the lower case.

2. The battery pack as claimed in claim 1, wherein the drainage holes provided in the second region are formed of a consistent size.

3. The battery pack as claimed in claim 1, wherein the foreign substance blocking portion is formed of a same size as the drainage holes provided in the second region.

4. The battery pack as claimed in claim 1, wherein the foreign substance blocking portion has a thickness that is smaller than a depth of the grooves.

5. The battery pack as claimed in claim 1, wherein the drainage holes are formed adjacent to corners of the bottom of the lower case.

6. The battery pack as claimed in claim 5, wherein the bottom of the lower case includes a second tilting portion that is formed tilted increasingly lower towards the drainage holes from a center region between the drainage holes provided in symmetrical positions.

7. The battery pack as claimed in claim 6, wherein an inner surface of the bottom of the lower case is formed tilted and an outer surface of the bottom of the lower case is formed flat such that a thickness of the bottom of the lower case varies.

8. The battery pack as claimed in claim 1, wherein the drainage holes are manufactured using a mold.

9. The battery pack as claimed in claim 1, wherein a receiving portion is formed at one region of the upper case and a projecting portion is formed at the lower case corresponding to the receiving portion such that the receiving portion and the projecting portion are interlocked.

10. A battery pack comprising:
a plurality of battery cells;
a case that receives the plurality of battery cells and has a first wall having an inner and outer side;
wherein at least one drainage hole is formed in the first wall, the drainage hole having a first region and a second region, wherein the first region extends from the inner side into the first wall to the second region and wherein the second region extends from the first region to the outer side of the first wall, wherein the first region defines a first surface that is contoured to induce liquid to flow from the inner side of the first wall to the second region and wherein the second region includes a blocking portion that is positioned within the drainage hole and wherein at least one groove is formed in the first wall so as to extend from the first region of the drainage hole to the outer side of the first wall.

11. The battery pack of claim 10, wherein the first wall comprises a bottom wall of the case.

12. The battery pack of claim 10, wherein the drainage hole has a first area at the inner side and a second area, less than the first area at the interface of the first and the second region.

13. The battery pack of claim 12, wherein the drainage hole comprises a substantially circular hole that has a first diameter at the inner surface and a second diameter, less than the first diameter at the interface between the first and second regions.

14. The battery pack of claim 10, wherein the blocking portion has a thickness that is less than the depth of the at least one groove.

15. The battery pack of claim 14, wherein the blocking portion includes an inner and outer surface and wherein the outer surface of the blocking portion is co-planar with the outer side of the first wall.

16. The battery pack of claim 15, wherein the inner surface of the blocking portion is contoured so that liquid on the inner surface of the blocking portion flows towards the at least one groove.

17. The battery pack of claim 16, wherein the at least one groove comprises a plurality of grooves and wherein the blocking portion surface has a raised portion and a plurality of lowered portions adjacent the openings to the plurality of grooves.

18. The battery pack of claim 10, wherein the at least one groove has a horizontal portion that extends in a direction substantially parallel to the inner side of the first wall and a vertical portion that extends in a direction between the inner and outer sides of the first wall.

19. The battery pack of claim 18, wherein the horizontal portion of the at least one groove is located at the interface between the first and second region and the vertical portion is located adjacent the blocking portion of the drainage hole.

20. The battery pack of claim 10, wherein the inner side of the first wall is contoured so that liquid flows from the first wall towards the at least one drainage hole.

* * * * *